Jan. 29, 1963 P. R. CASAVINA ETAL 3,075,240
APPARATUS FOR MAKING PREFORMED BUILDING ELEMENTS
Filed Feb. 5, 1960 2 Sheets-Sheet 1
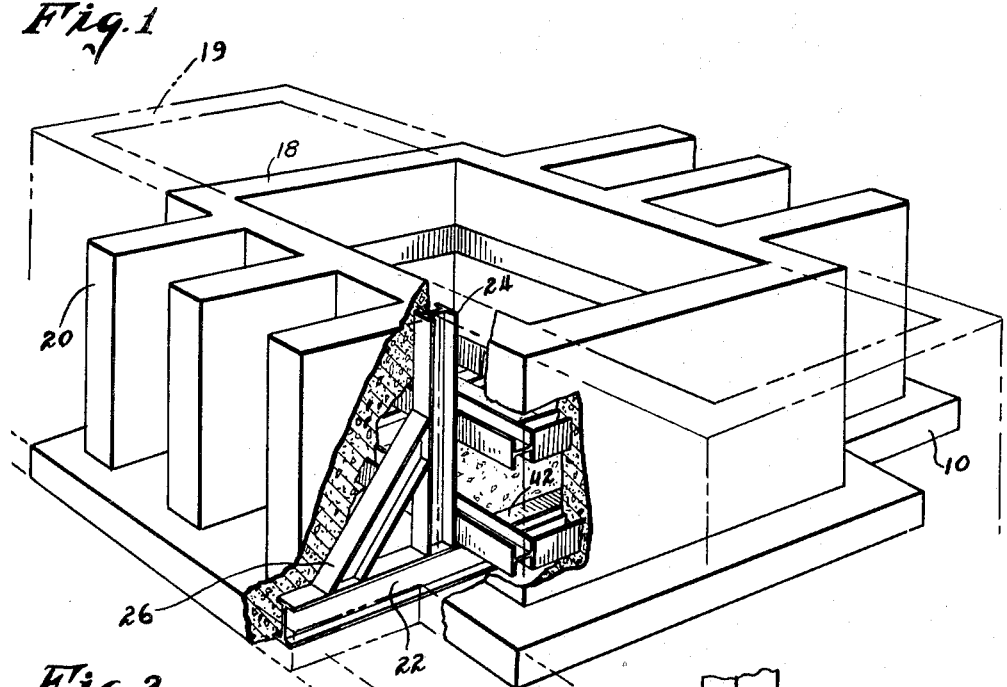
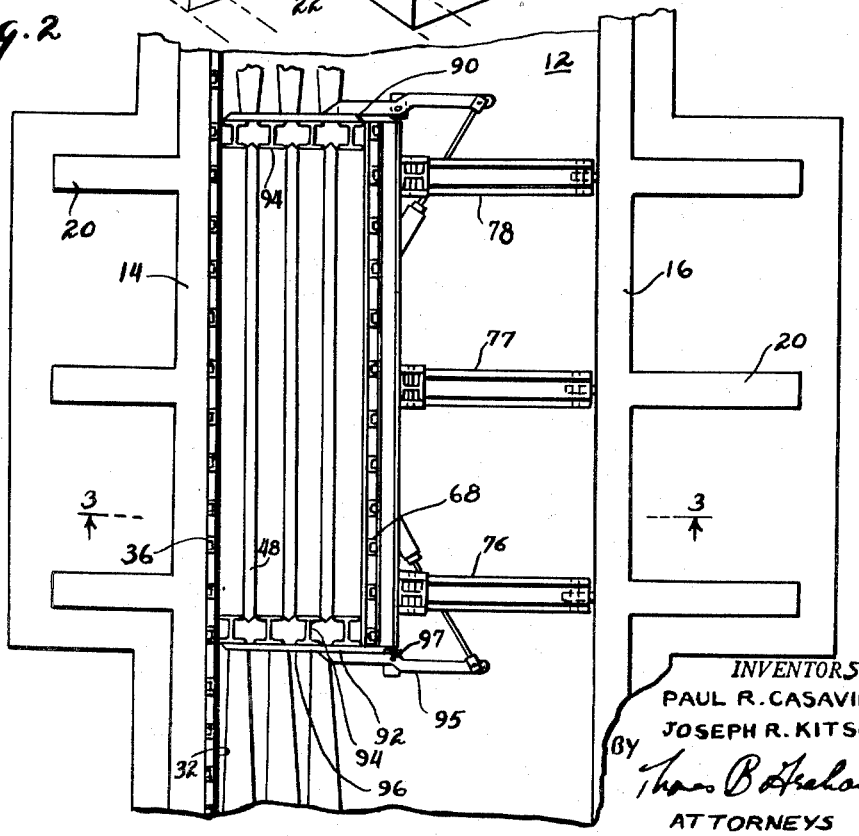
INVENTORS
PAUL R. CASAVINA
JOSEPH R. KITSON
By Thos B Hahn
ATTORNEYS

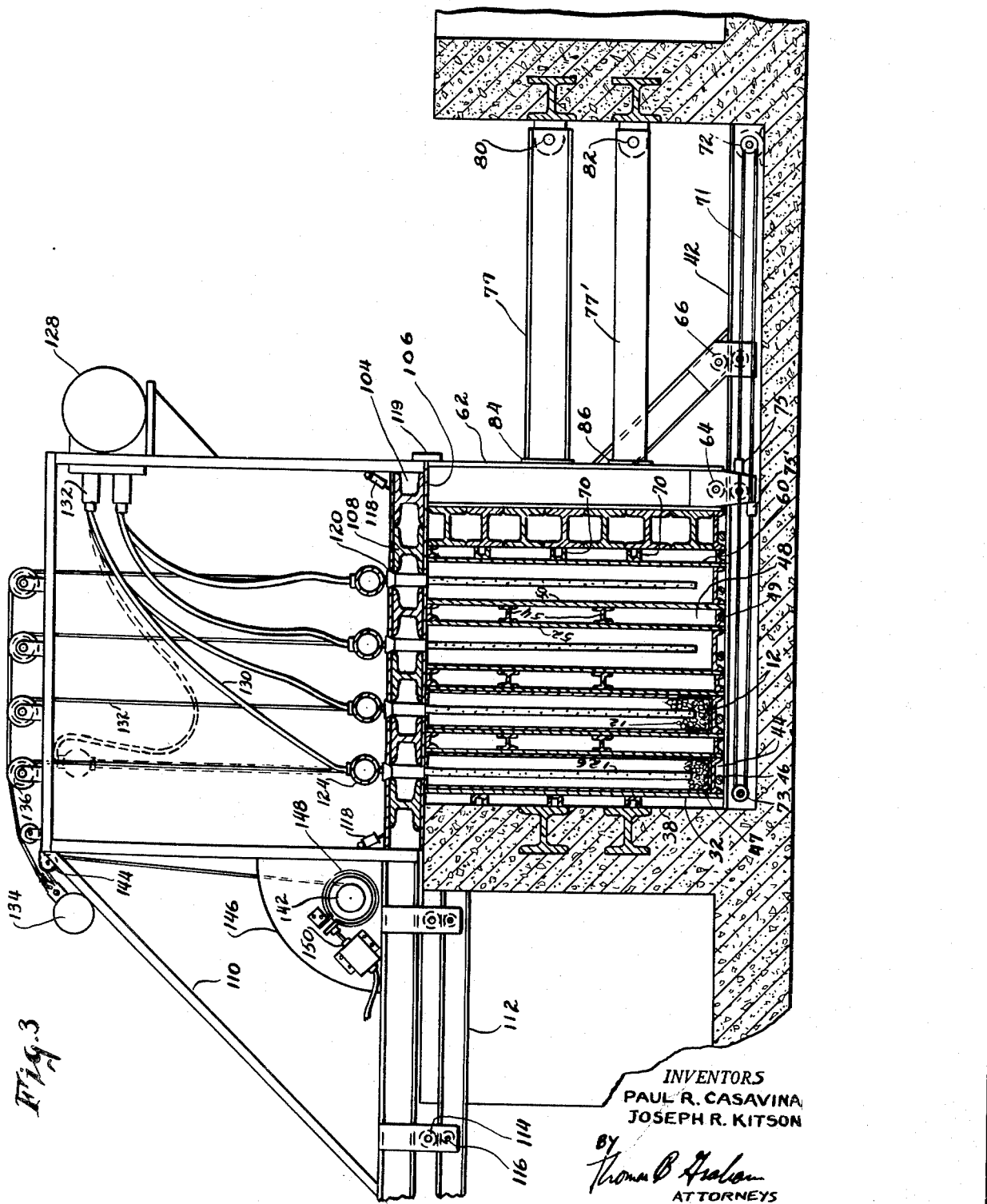

3,075,240
APPARATUS FOR MAKING PREFORMED BUILDING ELEMENTS

Paul R. Casavina, New York, N.Y., and Joseph R. Kitson, Newington, Conn., assignors to Casavan Industries, Inc., Paterson, N.J., a corporation of New Jersey
Filed Feb. 5, 1960, Ser. No. 11,943
2 Claims. (Cl. 18—5)

This invention relates to building modules, and more particularly, to the improved means for the construction of modular components used in building construction.

The art is familiar with the use of a building module comprising an inner and outer wall surface with insulation prepacked therebetween for use in the construction of buildings. In particular, such modules are employed in the fabrication of curtain walls, that is walls having for a primary function the exclusion of weather and in which a load-bearing framework is provided for structural strength.

The modules are conventionally fabricated in standard sizes, such as a 4 x 8 or 4 x 12 module. The module is often fabricated with an interior and exterior wall suitable for the application intended. During construction the builder then merely erects the modules to enclose the building.

Since the modules are fabricated in large sizes, the modules must be light in order that they may be handled easily during on-site construction. Thus, a lightweight insulation is preferred even though the module may be provided with an internal skeleton for load bearing purposes. Further, it is essential to effective use of such modules that dimensions of the module be held to close tolerances. The outline dimensions must be held to close tolerances to ensure module fit in the curtain wall without on-site fitting. The surfaces must be flat to provide the smooth uninterrupted appearance desired by the architects.

A convenient and suitable insulation for such modules is polystyrene foam. Polystyrene pellets are assembled within the module and steam introduced therein to foam the plastic into an insulating mass filling the entire module. The steam pressure coupled with the large surface area of the faces of the module require that the module be dimensionally restrained during fabrication to prevent bulging of the face surfaces thereof.

In order to so restrain the module the art clamped the module on a horizontally disposed platform during injection of the steam. Such clamping has restricted the panel fabrication to a single shot operation unduly increasing module cost by low production rates and requirement for large floor areas.

It is therefore the primary object of this invention to provide an improved means for the fabrication of building modules.

It is a further object of this invention to provide an improved means for the fabrication of a plurality of building modules in a single finishing operation.

It is a further object of this invention to provide an improved means for the fabrication of building modules of lightweight insulated form having inner and outer surfaces suitable for the application intended.

In accordance with these objects there is provided, in a preferred embodiment of this invention, a building module mold having a floor and vertically upstanding side and end walls enclosing the mold. The walls and floor are rigidly formed of concrete cast about a steel framework.

The mold is provided with a face plate spaced from and parallel to one end wall of the mold. The face plate is a plane surface suitable for forming the face of a module when in supporting engagement therewith. To maintain the face plate in the desired plane and to prevent distortion thereof, the face plate is buttressed by beams extending between the face plate and the end wall.

The mold floor is provided with tracks extending from the face plate. Trolleys or spacers are provided which extend parallel with the face plate and which are movably mounted on the tracks in the mold floor. Each trolley is dimensioned to match the dimensions of the side wall of a module and is rigid to supportably engage the module. Between trolleys there is provided a separator which is movably mounted on the tracks in the mold floor. Each separator comprises two flat, planar plates adapted to supportably engage the face of a module separated by and rigidly supported by beams between the plates.

A back face, parallel with the face plate, is also movably mounted upon the tracks in the floor. The back face comprises a face plate rigidly mounted on a structural framework. The back face is movable along tracks into contact with the stacked modules and is fixed in position by structural members extending between the framework and the buttressed mold wall. Similarly, side face members are provided for the mold. Each side face member is rigidly mounted on a structural framework which is hingedly connected to the back face framework to enable the side members to be swung into contact with the end walls of the stacked modules in restraining engagement therewith.

To complete the mold there is provided a top wall which is mounted in a superstructure movable along a track extending outwardly from the mold. The top wall is carried by the superstructure and positioned over the end faces of the stacked modules to close the mold. Suitable references may be provided to hold the wall in the desired position. The top wall is provided with a plurality of apertures which communicate with openings in the side walls of the modules when the mold is closed over a plurality of modules. A steam header is provided for each of the stacked modules which header carries a plurality of lances. The steam header is lowerable so that the lances extend through the apertures in the top wall into the entrance of the module.

In fabricating modules in accordance with this invention each module is stacked upon a trolley on the mold floor. The first module is trolleyed into contact with the face plate of the mold with the suitable facing material pressed thereagainst. This face material may be a thin sheet of marble or plastic suitable for the application intended. A separator is then moved into supporting engagement with the back of the module. The process is then repeated with the desired number of modules. When the requisite number of modules have been assembled in the mold, the back face is moved into supporting engagement with the last module, the side walls are closed, and the top wall is moved into supporting engagement with the sides of the modules.

Individual steam headers are then brought down upon the top wall of the mold to communicate with the apertures in the modules and steam is simultaneously introduced into the interior of each module to expand the insulator pellets contained therein into a solid foam-like insulator mass. The insulator mass may conveniently be expanded polystyrene. During the introduction of the steam pressure and the expansion of the insulator pellets into an insulating mass filling the module, the modules are restrained from distortion by the restraining action of the mold surfaces on each wall thereon.

The steam headers are then raised quickly, the top wall of the mold lifted and moved out of the way, the side walls are swung open and back walls of the mold are moved away and the modules are removed from the mold. The modules may then be shipped to the user or may be completed by additional manufacturing steps such as the application of flanges thereto, whichever is dictated by the application intended.

The invention may be more easily understood by reference to the following description taken in conjunction with the accompanying drawings of which:

FIGURE 1 is a partially sectioned perspective view of the mold structure.

FIGURE 2 is a top view of the mold in accordance with this invention showing the modules loaded therein.

FIGURE 3 is a cross sectional view taken along lines 3—3 of FIGURE 2.

In the figures there is shown a mold 10 having a floor 12 and vertically upstanding end walls 14, 16 and side walls 18, enclosing the floor surface. To ensure that the mold is capable of maintaining the dimensional tolerances of the enclosed modules during fabrication thereof, the mold is provided with a structural steel framework 22 over which is cast concrete.

In particular, the mold end walls 14, 16 must be rigid. For the necessary rigidity, the end walls 14 and 16 of the mold are formed from a steel reinforced concrete wall backed by buttresses 20. The buttresses are cast over an upright beam 24 and an inclined support beam 26. The side walls are positioned for the module size to be molded, as 19 for longer modules, and are reinforced with steel frame members.

The mold face plate 32, that is the surface upon which the module bears, comprises a vertically disposed flat steel plate rigidly fixed in the desired position parallel with and spaced from the mold wall 14 by strength members 36. The vertical members extend the length of the face plate and are spaced apart by horizontal members 38. The members support the face plate preventing deformation thereof during molding pressure.

Although the face plate is flat in most applications, the face plate of the mold may be provided with indentations to receive the face material to be bonded to the module such as thin laminations of marble. The rigidity of the face wall of the mold precludes deformation of the module during introduction of high pressure steam therein thus maintaining module dimension stability, and, further, insures that when working with a module having a face formed of a thin lamination of marble that the marble will not crack due to bowing of the module face.

The mold bottom wall 40 contains tracks 42 rigidly supported thereon. A plurality of trolleys 44 are movably mounted upon rollers 46 in contact with the tracks. The top surface of the trolley is dimensioned to match the side wall of the modules 47 which are loaded thereon. The trolley is formed from a structural member having the requisite strength to both support the module and to prevent deformation of the module wall during manufacture.

A plurality of spacer assemblies 48 are provided, each of which is movably mounted upon rollers 49 in contact with tracks 42. Each spacer 48 comprises face plates 50 and 52 separated by structural beams 54.

To load the mold, a module is placed on a trolley and moved against the face plate. A spacer is then moved against the other surface of the module. The spacer is sufficiently rigid to resist deformation of the surface of the module during introduction of the high pressure steam and to prevent deformation of any thin easily broken face laminate such as a surface marble laminate to be bonded to the module. The spacer surfaces, similar to the surface of the face plate, may be smooth or may be provided with recesses to carry facing material dependent upon the application intended. The back plate 52 of the spacer serves as the face plate against which a second module 58 may be moved.

After loading of each module within the mold a spacer is positioned behind the module. Upon loading of the requisite number of modules within the mold, the back face plate assembly 60 of the mold is moved into contact with the last module loaded. The back face plate assembly comprises a movable end wall 62 of rigid construction which is movable over the tracks in the mold floor by means of roller pairs 64 and 66 each astraddle the track flange and a back face plate affixed to the movable wall by means of horizontal and vertical I beams 68 and 70 respectively. By such mounting, the rigidity of the back face plate 60 is maintained to prevent distortion of the module in contact therewith.

To move the back wall assembly there is provided a continuous loop of wire rope 71 driven by drum 73 around pulley 74. Latches 75 and 75' are provided to selectively couple the back wall assembly and thus move the back wall assembly in the desired direction.

To maintain the movable wall in the position desired, struts 76, 77 and 78 are provided. Each strut comprises two beams 77 and 77' hingedly connected by means of pivots 80 and 82 to the back wall of the mold. When swung into the operative position the struts bear upon the movable end wall of the mold at the bearing position defined by bearing plates 84 and 86.

To maintain the dimensional stability of the ends of the modules, mold side walls 90 and 92 are provided. The side walls comprise a plurality of members 94 adapted to bear on the end wall of the module in supporting contact therewith. The members 94 are affixed to plate 96 hingedly coupled to the back wall assembly by hinge 95 and coacting hinge pin 97. A hydraulic cylinder 98 is provided to open and close the side walls.

The mold is then closed by moving the top wall 104 into position over the stacked modules. The top wall 104 comprises a bearing plate 106 rigidly supported in position by a plurality of structural I beams 108.

The top wall is carried in a superstructure 110 movably mounted on tracks 112 extending from the mold end wall. To ensure that the superstructure is supported by the track, the superstructure is provided with rollers 114 in rolling engagement with the track and keeper rollers 116 engaging the track flange. In order to provide clearance between the top wall and the top of the mold walls, the top wall may be lifted slightly by hydraulic pistons 118. When lifted, the entire superstructure may be moved to the left to open the mold or to the right to position the top wall above the closed position. The top wall may then be lowered to provide a wall restraining deformation of the ends of the module during injection of steam therein. The top wall is locked in the closed position by latch 119.

The end wall is provided with a plurality of apertures 120 communicating with apertures within the sides of the module. The apertures are provided for the introduction of steam to expand the pellets 122 contained within the modules into an insulating mass of foamed plastic. This plastic insulation is lightweight and provides the insulating qualities dictated by the application intended. It has been found desirable to use an expanded polystyrene as an insulating medium.

To provide the necessary steam for the expansion of the polystyrene pellets a steam header 124 is provided for each module. The steam header extends the length of the module and carries a plurality of lances 126 adapted for insertion within the module when the header is lowered. Each module header is controllably supplied with steam at the requisite temperature and pressure from a main header 128 coupled to the individaul headers through flexible piping 130 and quick acting valves 132.

The individual headers are suspended by cables 132 coupled between the header and a counterweight 134 over pulleys 136. The counterweight is mounted on rollers for movement along the inclined rails of the superstructure. The counterweight overbalances the combined weight of the headers to hold the headers in the raised position in the superstructure. When the mold is loaded, the counterweight is pulled up into the position shown by cable 140 extending between the driven drum 142 and the counterweight over pulley 144. The drum is mounted in a bearing having the outer race thereof mounted in the web 146.

Raising of the counterweight lowers the headers from the raised position (shown in dotted outline) to the lowered position. The drum 142 is then locked by the peripheral brake band 148 actuated by hydraulic piston 150 and the drive motor for the drum disconnected therefrom. It has been found preferable to use an electric motor drive for the drum. Removal of power therefrom frees the drum for driven rotation when the brake is released. The valves 132 are then opened, admitting steam at the requisite pressure and temperature to the module interior.

After steam has been admitted for the requisite cycle interval the lances are quickly withdrawn to allow the foaming plastic to substantially fill the module and to prevent adherence of the lance to the plastic. To effect such quick removal, the brake 148 is released, the counterweight quickly falls, and the headers 124 are quickly snapped to the raised position. During the steam injection cycle, the mold dimensionally restrains the modules, preventing deformation thereof by the steam pressure.

In operation of the mold therefor, the module is assembled on the movable trolleys 44 and with the surface coating thereon moved into contact with the face wall of the mold. A requisite plurality of modules are then similarly assembled with separators 48 between modules. The mold is then locked up by bringing the back wall into contact with the last module, closing the side walls, and enclosing the top of the mold. The steam header is then lowered into position over the modules and high pressure steam heat introduced into the interior of the module to expand the stryofoam pellets contained therein into a lightweight insulating foam. The headers are then quickly withdrawn. During the entire processing, the module is restrained from dimensional distortion so that the module is fabricated with the dimensional tolerances required by module construction.

Thereafter, the mold is opened and the modules removed for subsequent processing or shipment to the ultimate user.

While the building module and mold has been described in terms of styrene pellets expanded or foamed by steam, it will be understood that other foaming compositions, such as the urethane type foams which set to form a firm mass may be used. Thus, when the urethene reactants are in liquid or solution form, measured amounts are injected into the assembly and react to fill the module. The mold will, in such cases, prevent module deformation under the pressures of the expanding foam.

It will be noted that the invention may be variously embodied and modified within the scope of the subjoiner claims.

What is claimed is:

1. A multiple mold for fabrication of a plurality of large building modules having thin walls within which is inserted material adapted to expand into an insulating foam-like mass when steam is applied thereto comprising a floor having tracks extending longitudinally thereof, a first vertically upstanding end wall and a second vertically extending end wall extending transversely of said floor, said end walls being fabricated of cast concrete buttressed by concrete buttresses within which is mounted a steel framework for dimensional strength, transversely extending trolleys movable over said tracks, said trolleys dimensioned to match the dimensions of the side walls of said module, transversely extending separators movable longitudinally over said tracks in said floor, said separators dimensioned to match the dimensions of the faces of the module, said separators being positioned between adjacent trolleys to define a plurality of cavities ae each trolley position for the receipt of a building module, a face plate positioned in front of and separated from one end wall, a back wall movable over said floor, said back wall comprising a back face plate rigidly affixed thereto, a first and second side wall movable into restraining contact with the end walls of the modules, a top wall movable into restraining position against the side walls of the module, said top wall having a plurality of apertures therethrough communicating with apertures in the side walls of said modules, means for securing said top wall in position in contact with said modules, a steam header provided with a plurality of nozzles, means for lowering said header until said nozzles enter said aperture in said top wall, and means for quickly raising said headers.

2. A multiple mold in accordance with claim 1, which includes, a continuous loop of cable, means for driving said cable loop, and means for selectably coupling said back face plate to one strand of said loop to move said back face plate in a selectable direction.

References Cited in the file of this patent
UNITED STATES PATENTS

| | | |
|---|---|---|
| 784,154 | Gutteridge et al. | Mar. 7, 1905 |
| 1,468,065 | Williams | Sept. 18, 1923 |
| 1,919,807 | Sharpe | July 25, 1933 |
| 2,250,020 | Henderson | July 22, 1941 |
| 2,495,100 | Henderson | Jan. 17, 1950 |
| 2,753,642 | Sullivan | July 10, 1956 |
| 2,916,795 | Henderson | Dec. 15, 1959 |
| 2,948,926 | Kuhn | Aug. 16, 1960 |
| 2,960,505 | Frank | Aug. 30, 1960 |

FOREIGN PATENTS

| | | |
|---|---|---|
| 900,191 | Germany | Dec. 21, 1953 |

OTHER REFERENCES

Fabrication Methods for Expandible Polystyrene, Plastics Technology, July 1956, pages 452–455.

Expandable Polystrene, Koppers Catalog, Koppers Co., Inc., 1954, pages 11, 19, 21, 24.